(12) United States Patent
Nellessen et al.

(10) Patent No.: US 6,306,250 B1
(45) Date of Patent: Oct. 23, 2001

(54) METHOD OF REMOVING CAPSULE OILS FROM SELF-COPYING PAPER

(75) Inventors: Bernhard Nellessen, Kaarst; Klaus Hornfeck, Mettmann; Berthold Schreck, Duesseldorf; Sabine Heinen, Hilden; Bodo Hilterhaus, Moenchengladbach; Dieter Baumgarten, Bielefeld, all of (DE)

(73) Assignee: Nopco Paper Technology Holding AS, Drammen (NO)

( * ) Notice: Subject to any disclaimer, the term of this patent is extended or adjusted under 35 U.S.C. 154(b) by 0 days.

(21) Appl. No.: 09/341,205
(22) PCT Filed: Dec. 19, 1997
(86) PCT No.: PCT/EP97/07172
  § 371 Date: Oct. 8, 1999
  § 102(e) Date: Oct. 8, 1999
(87) PCT Pub. No.: WO98/30750
  PCT Pub. Date: Jul. 16, 1998

(30) Foreign Application Priority Data

Jan. 7, 1997 (DE) .............................................. 197 00 253

(51) Int. Cl.$^7$ ...................................................... D21C 5/02
(52) U.S. Cl. .................................................................. 162/5
(58) Field of Search ...................................................... 162/5

(56) References Cited

U.S. PATENT DOCUMENTS

| 3,933,578 | 1/1976 | Kazugai et al. | 162/5 |
| 4,162,186 | 7/1979 | Wood et al. | 162/5 |
| 5,259,969 | 11/1993 | Srivatsa et al. | 252/60 |
| 5,632,857 | * 5/1997 | Larson | 162/5 |

FOREIGN PATENT DOCUMENTS

| 0 050 494 | 4/1982 | (EP) . |
| 0 717 144 | 6/1996 | (EP) . |

OTHER PUBLICATIONS

M. Saendig, "Handbuch der Papier und Pappenfabrikation" Second Edition vol. 1, Niederwalluf (1971) p. 1484.

* cited by examiner

Primary Examiner—Dean T. Nguyen
(74) Attorney, Agent, or Firm—Young & Thompsn

(57) ABSTRACT

A process for removing capsule oils from carbonless copy paper involving: (a) providing carbonless copy paper containing capsule oils; and (b) disintegrating the carbonless copy paper in the presence of an alkoxylated $C_{12-14}$ alcohol to form a stock suspension.

9 Claims, No Drawings

METHOD OF REMOVING CAPSULE OILS FROM SELF-COPYING PAPER

BACKGROUND OF THE INVENTION

This invention relates to a process for removing capsule oils from carbonless copy paper in the presence of nonionic surfactants as additive. The invention also relates to the use of these nonionic surfactants for removing capsule oils from carbonless copy paper.

Wastepaper is now being increasingly used for the manufacture of, for example, newsprint and sanitary paper. A special type of wastepaper is so-called carbonless copy paper. Carbonless copy papers contain microcapsules in which dye precursors and so-called capsule oils are present. The function of these capsule oils is to dissolve and/or disperse the dye precursors present in the microcapsules. Now, in the remanufacture of carbonless copy paper, the microcapsules are destroyed by the mechanical stressing the paper undergoes during the slushing step so that the capsule oil is released.

The remanufacture of carbonless copy paper is normally carried out in two steps. The first step is compulsory, the second optional.

The first step in the remanufacture of carbonless copy paper, so called disintegration, may be described as follows: disintegration is generally understood by the expert to be the process of defibration of wastepaper—in the present case the defibration of carbonless copy paper. This process may be induced, for example, in aqueous medium by the application of mechanical energy, for example by stirring. In the case of carbonless copy paper, defibration is accompanied by substantial destruction of the microcapsules present in the paper, the capsule oils they contain being released.

In the second step of the remanufacturing process, the stock suspension is washed and/or subjected to flotation.

If the remanufacturing process mentioned is carried out in the absence of special additives, studies conducted by applicants have shown that around 86% of the capsule oils are removed without washing and/or flotation and that around 94% are removed where washing and/or flotation is/are carried out.

Like other office and administration papers, carbonless copy papers are increasingly entering the recycling circuit. For hygienic and functional reasons, it is desirable in this regard to remove as much of the capsule oil present in the microcapsule coating of the carbonless copy papers as possible during the recycling of fibers from these wastepapers. This prevents, for example, unwanted discoloration of the recycled fibers and the transfer of capsule oils from papers produced using these fibers to foods packed therein. This is very important in particular when the oils used in the carbonless copy papers are aromatic and/or paraffinic, for example alkylated napthalenes, alkylated biphenyls or hydrogenated oils based on mineral oils.

DESCRIPTION OF THE INVENTION

The problem addressed by the present invention was to provide a process for removal capsules oils from carbonless copy paper which would be distinguished by an improved removal of capsule oils. More particularly, the removal of capsule oils in the remanufacture of carbonless copy papers would amount to at least 90%.

It has now surprisingly been found that the problem stated above is elegantly solved if nonionic surfactants (nonionics) are used as additive in the remanufacture of carbonless copy paper. Products of the addition of ethylene oxide and/or propylene oxide onto alcohols containing 8 to 24 carbon atoms have proved to be particularly suitable.

In a first embodiment, therefore, the present invention relates to a process for removing capsule oils from carbonless copy paper in which carbonless copy paper is disintegrated to form a stock suspension which is optionally washed and/or subjected to flotation, characterized in that disintegration and/or washing and/or flotation is/are carried out in the presence of at least one additive selected from the group of nonionic surfactants (nonionics).

Basically, the type of nonionic surfactant used is not critical. In principle, therefore, any nonionics relevantly known to the expert may be used in the process according to the invention. However, one particularly important embodiment of the invention is characterized by the use of addition products of ethylene oxide (EO) and/or propylene oxide (PO) with alcohols containing 8 to 24 carbon atoms. These addition products may be pure EO adducts (alcohol ethoxylates), pure PO adducts (alcohol propoxylates), EO/PO adducts or mixtures of the species mentioned.

In the case of the alcohol ethoxylates, the proportion of EO in the molecule should be on average 2 to 20 mol per mol of alcohol. So far as the alcohol propoxylates are concerned, the proportion of PO in the molecule should be on average 2 to 20 mol per mol of alcohol.

In the case of the EO/PO adducts,
  a) the sum of EO and PO should be on average 2 to 20 mol per mol of alcohol and
  b) EO and PO should be present in the adducts in molar ratios of 1:10 to 10:1.

So far as the chain length of the alcohols on which the EO and/or PO adducts mentioned are based is concerned, particularly good results are obtained when fatty alcohols with chain lengths of 12 to 18 carbon atoms are used.

In one preferred embodiment of the present invention, fatty alcohol ethoxylates are used as additives either individually or in the form of a mixture. The fatty alcohols on which the EO and/or PO adducts are based are preferably selected so that they essentially contain 12 to 14 carbon atoms.

The additive is normally used in a quantity of 0.1 to 5% by weight, based on the input of paper to be remanufactured. However, smaller or larger quantities of additive may also be used in individual cases at the discretion of the expert. This will largely depend on the type and quantity of oil to be removed, by the type of carbonless copy paper and by the stock consistency in the pulper and during washing.

The following Examples are intended to illustrate the invention without limiting it in any way.

EXAMPLES

Additives Used
  a) LS3 adduct of 3 mol EO with 1 mol of a $C_{12-14}$ fatty alcohol ("DEHYDROL LS3", a product of Henkel KGaA)
  b) LS54: adduct of 5 mol EO and 4 mol PO with 1 mol of a $C_{12-14}$ fatty alcohol ("DEHYDROL LS54", a product of Henkel KGaA)

Test Description

The following process steps known to the expert were successively carried out:
  a) disintegration and slushing of the test paper
  b) laboratory washing of the slushed test paper
  c) Rapid-Köthen sheet forming
  d) extraction with dichloromethane.
2. Test Conditions
  2.1 Disintearation and slushing of the test paper
  Test paper: 100% carbonless copy paper from Stora Carbonless
    Paper GmbH (type "Giroform")—a mixture of CB (coated back) and CFB (coated front and back) paper
  Pulper: Horbart Kitchen Aid(=high consistency pulper)

Duration: 15 minutes
Temperature: 45° C.
Pulp consistency: 20%
Additive: The particular additive to be investigated was added at the beginning of the slushing step, cf. also Table 1.

2.2 Laboratory washing test

For the laboratory washing of the disintegrated test paper, the pulp consistency was reduced from 20% to 1% by dilution with water. Washing was carried out in a laboratory washing cell (type: Degussa, duration: 10 minutes, temperature: 45° C.). The water throughput was 1 liter per minute.

The tests were carried out with and without laboratory washing. Particulars are set out in Table 1.

2.3 Ragid-Köthen sheet forming

On completion of washing, a sample of the aqueous fiber suspension with a stock content of about 2.5% by weight was removed and used for Rapid-Köthen sheet forming (Rapid-Köthen sheet forming is known to the expert from the literature, cf. for example: "*Handbuch der Papier- und Pappenfabrikation*", Second Edition, Vol. I, Niederwalluf 1971, page 1484.

2.4 Extraction with dichloromethane

The percentage of capsule oil in the paper was determined by extraction with dichloromethane by the method described in DIN 54354 and calculated in accordance with the following formula:

amount of capsule oil in percent=100(A−B)/A where

A=dichloromethane-extract-untreated paper in %, based on amount of paper weighed out B=dichloromethane-extract-treated paper in %, based on amount of paper weighed out.

Results

The test results are set out in Table 1. It was found that the removal of capsule oil was considerably improved by the use of the nonionic surfactants according to the invention.

TABLE 1

| | | | Removal of capsule oil | | |
|---|---|---|---|---|---|
| | High consistency | | Additive | | Removal of capsule |
| Example | pulper | Washing | Quantity[a] | Type | oil |
| V-1 | Yes | No | None | | 86% |
| B-1a | Yes | No | 0.3% | 30% LS3, 70% LS54 | 91% |
| B-1b | Yes | No | 0.3% | 70% LS3, 30% LS54 | 94% |
| V-2 | Yes | Yes | None | | 94% |
| B-2a | Yes | Yes | 0.3% | 30% LS3, 70% LS54 | 94% |
| B-2b | Yes | Yes | 0.3% | 70% LS3, 30% LS54 | 98% |

[a] Percentages are based on oven-dry paper input

What is claimed is:

1. A process for removing capsule oils from carbonless copy paper comprising:

(a) providing carbonless copy paper containing capsule oils;

(b) disintegrating the carbonless copy paper in the presence of an alkoxylated $C_{12-14}$ alcohol to form a stock suspension; and (c) removing the capsule oils from the stock suspension.

2. The process of claim 1 wherein the alkoxylated $C_{12-14}$ alcohol is ethoxylated with, on average, from 2 to 20 moles of ethylene oxide per mole of alcohol.

3. The process of claim 1 wherein the alkoxylated $C_{12-14}$ alcohol is propoxylated with, on average, from 2 to 20 moles of propylene oxide per mole of alcohol.

4. The process of claim 1 wherein the alkoxylated $C_{12-14}$ alcohol is a mixture of a $C_{12-14}$ alcohol ethoxylate and an adduct of ethylene oxide/propylene oxide.

5. The process of claim 4 wherein the adduct of ethylene oxide/propylene oxide contains a sum of ethylene oxide and propylene oxide, on average, of from 2 to 20 moles, per mole of alcohol, and wherein the ethylene oxide and propylene oxide are present in the adducts in molar ratios of from 1:10 to 10:1.

6. The process of claim 1 further comprising washing the stock suspension of (b) to form a washed stock suspension.

7. The process of claim 1 further comprising subjecting the stock suspension of (b) to flotation process.

8. The process of claim 1 further comprising subjecting the washed stock suspension to a flotation process.

9. A process for removing capsule oils from carbonless copy paper comprising:

(a) providing carbonless copy paper containing capsule oils;

(b) disintegrating the carbonless copy paper in the presence of an alkoxylated $C_{12-14}$ alcohol to form a stock suspension;

(c) removing the capsule oils from the stock suspension;

(d) washing the stock suspension to form a washed stock suspension; and (e) subjecting the washed stock suspension to a flotation process, wherein the disintegrating, washing and flotation are all conducted in the presence of an alkoxylated $C_{12-14}$ alcohol.

* * * * *